United States Patent [19]

Ghali et al.

[11] Patent Number: 4,945,154

[45] Date of Patent: Jul. 31, 1990

[54] DENSIFIED POLYETHERSULFONE

[75] Inventors: Mounir M. Ghali, Dublin; Winston L. Hedges, Livermore, both of Calif.

[73] Assignee: Hexcel Corporation, Dublin, Calif.

[21] Appl. No.: 377,116

[22] Filed: Jul. 7, 1989

[51] Int. Cl.$^5$ .............................................. C08F 6/14
[52] U.S. Cl. .................................... 528/480; 528/490; 528/496; 528/497; 528/498; 528/503; 524/319; 524/323; 524/326; 524/366; 524/376; 524/379; 524/380; 427/44
[58] Field of Search ............... 528/480, 490, 496, 497, 528/498, 503; 524/319, 323, 326, 366, 376, 379, 380; 427/44

[56] References Cited

U.S. PATENT DOCUMENTS

| | | | |
|---|---|---|---|
| 3,523,906 | 8/1970 | Vrancken et al. | 524/609 |
| 3,875,103 | 4/1975 | Leslie | 524/84 |
| 4,089,843 | 5/1978 | Rausch, Jr. | 528/492 |
| 4,730,018 | 3/1988 | Robeson | 524/360 |

*Primary Examiner*—John Kight, III
*Assistant Examiner*—Sam A. Acquah
*Attorney, Agent, or Firm*—Oblon, Spivak, McClelland, Maier & Neustadt

[57] ABSTRACT

Polyethersulfone is densified by preparation of a homogeneous paste with a semi-solvent, which may be drawn off by heating and vacuum, from an emulsion prepared from the paste. The resulting PES is substantially densified, with a reduced surface area. The densified PES can be added in significant amounts to thermosetting resin preparations, without a substantial increase in of viscosity.

12 Claims, No Drawings

DENSIFIED POLYETHERSULFONE

BACKGROUND OF THE INVENTION

This invention pertains to polyethersulfone particularly designed for use as a toughening agent in thermosetting matrix resins, for matrix/fiber composite materials. The polyethersulfone is modified, so as to allow incorporation of significant amounts of the toughening agent in the resin matrix without loss of physical properties.

BACKGROUND OF THE PRIOR ART

Resin matrix/fiber composite materials are enjoying increased attention and application in situations requiring a low weight per strength yield profile, and additional characteristics, such as solvent resistance and the like. One field conspicuous in its use of these types of composite materials is the aerospace industry, both commercial and military.

As composite materials receive increased attention and use, new applications and requirements for these materials are envisioned. In particular, impact resistance and matrix resin toughness, are increasingly emphasized in the manufacture of parts and products prepared from composite materials. One common method for improving the toughness characteristics of composite materials prepared from thermosetting resin matrix materials is the addition of thermoplastic polymers. In general, the thermoplastics are dissolved into the liquid thermosetting resin or simply mixed in as a solid powder. In either case the amount of thermoplastic which can be incorporated into the resin matrix is limited by the effect of the thermoplastic on the processing charactersitics of the resulting thermosetting resin, specifically the viscosity and tack. Maintenance of tack and flow (or acceptable viscosity) often means the thermoplastic cannot be used at elevated loading levels necessary for achievement of optimum mechanical properties.

One particularly desirable thermoplastic, owing to the properties that it confers on the composite material, is the class of polyethersulfones. However dissolving the PES into the resin greatly increases the resin viscosity and reduces resin tack at PES levels far below those necessary to optimize the mechanical properties of the cured resin. Furthermore, PES is generally produced by a solution polymerization followed by precipitation, giving rise to a spongy, porous product having a relatively low density. Therefore the addition of significant amounts of dry material literally "soaks up" the matrix resin, making the entire composition friable at weight additions of about 10–15%, substantially below desirable loading maximums.

Accordingly, it remains an object of the industry to provide a method whereby significant loadings, in excess of 15% of PES can be added to thermosetting matrix resins, such as epoxy-based resins, polyesters and the like, without loss of processability and physical properties.

SUMMARY OF THE INVENTION:

Densified PES is prepared by introducing the PES to a semi-solvent, such as methylene chloride, to obtain a paste-like product. We define here a semi-solvent as being a liquid which is not a true solvent for a given thermoplastic, but one which softens said thermoplastic into a paste. In large volumes a true solvent will dissolve the thermoplastic. Excess semi-solvent above the saturation point of the thermoplastic simply separates from the paste. The paste is added to a significant volume of water and emulsified in a high-shear mixer, such as a Ross Versamix or Myers mixer. The emsulsion is stabilized by the addition of dispersing agents. Under conditions of complete emulsification the semi-solvent may be removed, conveniently by the application of vacuum. The densified PES is recovered in particles (from 1 to 100 microns in size) which are more or less spherical in shape depending on the level of shear applied during the process. The PES particles have a sharply reduced surface are and higher density compared to commercial PES powder. The densified PES can be added to conventional thermosetting matrix resins in amounts up to about 40%, by weight.

DETAILED DESCRIPTION OF THE INVENTION

The process for the preparation of densified PES begins with the saturation of the PES with a "semi-solvent", such as methylene chloride.

A volume of methylene chloride is added to a given quantity of PES such that the PES is completely saturated with methylene chloride and becomes a paste. This material is then charged into a high shear mixer along with a volume of water sufficient to emulsify the saturated PES. Dispersing agents are added to stabilize the emulsion. The mixture is then subjected to high shear agitation. With the high shear mixer in operation, vacuum is applied to the system. Preferably this vacuum should remain constant throughout the operation. Heat is then applied to the system, causing the methylene chloride to evaporate from the mixture into a condensing system. The heat is applied slowly, in a very controlled fashion, such that the temperature of the mixture rises gradually to approximately 45° C. At this point the temperature can be raised rapidly to a temperature of approximately 90° C. to ensure removal of most of the methylene chloride. The resulting suspension of PES particles in water is cooled and filtered. The filtered particles are washed and dried. If desired the particles may be classified by sieving or by other commonly used classification techniques. These densified particles of PES allow for much higher loading of PES into a liquid resin system without causing problems such as loss of tack and unmanageable viscosity increases when compared to commercially available PES powder.

The process for preparing the PES microspheres requires a mixing vessel capable of high shear agitation. Furthermore, this mixing vessel should be equipped with a fine-control heating system (preferably a circulating-fluid heating system and a vacuum system. A low temperature condenser system (set for forward take-off of condensate) for condensing the methylene chloride, and a receiving vessel are also necessary.

This invention may be further understood with reference to the following Example.

EXAMPLE (1) Prepare a "mixture" of 21.473 kg of methylene chloride and 4.00 kg of PES. Mix until the PES has the consistency of a homogeneous paste.

(2) Transfer the mixture of step 1 into a ten gallon capacity Ross mixer or other high shear capable mixer.

(3) Prepare a solution consisting of 15.12 kg of deionized water, 400.0 grams of polyvinyl alcohol (3000 mw, 75% hydrolyzed), and 400.0 grams of glycerine. Preparation of the solution is easier if the glycerine is added after the polyvinyl alcohol is completely dissolved.

(4) Charge the solution prepared in step 3 into the ten gallon mixer.

(5) Start the anchor blade at 30% of maximum speed. (The exact percentage of maximum speed will depend on the specific type of mixer being used.)

(6) Start the homogenizer blade at 50% maximum speed. (The exact percentage of maximum speed will depend on the specific type of mixer being used.)

(7) Apply cooling to the condenser. A cooling fluid temperature of less than 0° C. is needed for the efficient condensation of methylene chloride once vacuum has been applied to the system.

(8) Apply four to six inches of vacuum to the system. Once the vacuum is set, it should be maintained at a constant setting for the duration of the run.

(9) Begin heating the mixer vessel using the circulating-fluid heating system. The jacket temperature on the mixer should be maintained at approximately 3° C. above the temperature of the mixer contents.

(10) At this point, methylene chloride will begin to volatilize from the mixer and condense in the condenser. The 3° C. differential should be maintained during the course of the run. This causes the temperature of the mixture to rise slowly as the methylene chloride slowly volatilizes. The vacuum should be held constant for the duration of the run. A small increase in the vacuum or a rapid increase in the heating of the mixer will cause foaming of the contents.

(11) When the temperature inside the mixer reaches 45° C, the contents of the mixer can be heated rapidly to 90° C.

(12) Maintain the temperature of the mixer contents at 90° C.+/−2° C. for one hour.

(13) Cool the mixer contents to a temperature of from 20°-25° C.

(14) Filter the contents of the mixer using Whatman #50 or similar filter paper.

(15) Suspend the filter cake in five gallons of deionized water. When suspension appears uniform, filter the suspension through Whatman #50 or equivalent filter paper.

(16) Repeat step 15.

(17) Break up the filter cake and dry it in a forced air oven at 90-100° C.

(18) After drying, the filter cake may be further broken up mechanically or the microspheres may be classified by passing them through a series of sieves or by some other classification technique.

Thus, specific process steps are followed in the production of densified PES, including preparation of a homogeneous paste of the PES in a semi-solvent therefore, and preparation of an emulsion, by addition of a large amount of water to the paste. The emulsion may be stabilized by the addition of suitable dispersing agents such as polyvinyl alcohol and glycerine. The emulsion is generated and maintained under high shear conditions. Application of heat, coupled with a modest vacuum, volatilizes the semi-solvent, which may be separately recovered. After heating at about 85°-95° C. for a period of an hour or two, to ensure relatively complete removal of the methylene chloride, the densified PES is recovered by filtration and washing, followed by drying. This process results in the preparation of "microspherical" particles, which are more or less spherical in shape, and range from a dimension of about 1-100 microns depending on the level of shear applied and the amount of dispersing agent used.

This densified PES, owing to the sharp reduction in surface area when compared to PES powder, is useful for incorporation in conventional thermosetting resins, such as epoxy-based resins, polyester-based resins, etc. A particularly preferred resin for use with the toughening agent addressed herein is the epoxy/cyanate resin that is the subject of copending patent applications Ser. No. and 377,087 and 377,166, commonly assigned herewith, filed in the name of Baron et al. As noted, incorporation of the densified PES may be practiced in amounts up to about 40% by weight, without significant increase in viscosity or loss of processability or physical characteristics, when compared to conventional PES.

The invention has been disclosed above in terms of both general description and specific example. Variations on specifics will occur to those of ordinary skill in the art, without exercise of inventive faculty, and do not depart from the invention. In particular, substitution of various semi-solvents, times, temperatures, dispersing agents, pressure, to achieve the same effects, without a change in function or utilization, will not depart from the scope of the invention, save for the recitation of the claims appended hereto.

What is claimed is:

1. Densified polyethersulfone (PES) in the form of particles about 1-100 microns in diameter of reduced surface area as compared with undensified polyether sulfone prepared by solution polymerization followed by precipitation, such that up to 40% by weight of said densified polyethersulfone may be added to a thermosetting resin, with retention of sufficient tack and flow for processability.

2. The densified polyethersulfone of claim 1, wherein said particles are microspherical in shape.

3. The particles of claim 1, wherein said particles range from about 1-30 microns in their largest dimension, an aspect ratio of less than three, and having a substantially smooth surface.

4. Densified PES, prepared according to the process comprising:
    saturating PES with a semi-solvent therefore until a homogeneous paste is obtained,
    making a stabilized emulsion of said paste in water by application of high shear mixing, with surfactants added in amounts sufficient to stabilize said emulsion, subjecting said stabilized emulsion to a controlled vacuum while applying heat such that the temperature of the heating medium remains approximately 3° C. above the temperature of the mixture until the temperature of the mixture reaches about 45° C., and thereafter increasing the heating such that the temperature of the mixture rises to approximately 90°-95° C., maintaining said vacuum and temperature for a period of time sufficient such that the semi-solvent is largely removed from the emulsion, and thereafter cooling said mixed preparation, and recovering, washing and drying the densified PES obtained therefrom.

5. The product of claim 4, wherein said surfactants are polyvinyl alcohol and glycerine.

6. The product of claim 4, wherein said vacuum is sufficient to cause volatilization of said semi-solvent, upon application of said heating.

7. The densified PES of claim 4, wherein said semi-solvent is methylene chloride.

8. A method of preparing densified PES, comprising:

saturating PES with a semi-solvent therefore until a homogeneous paste is obtained, making a stabilized emulsion of said paste in water by application of high shear mixing, with surfactants added in amounts sufficient to stabilize said emulsion, subjecting said stabilized emulsion to a controlled vacuum while applying heat such that the temperature of the heating medium remains approximately 3° C. above the temperature of the mixture until the temperature of the mixture reaches about 45° C., and thereafter increasing the heating such that the temperature of the mixture rises to approximately 90–95° C., maintaining said vacuum and temperature until the solvent is largely removed from the emulsion, and thereafter cooling said mixed preparation, and recovering, washing and drying the densified PES obtained therefrom.

9. The process of claim 8, wherein said vacuum is sufficient to cause volatilization of said semi-solvent, upon said heating.

10. The process of claim 8, wherein said surfactants are polyvinyl alcohol and glycerine.

11. The process of claim 8, wherein said semi-solvent is methylene chloride.

12. A matrix resin for preparation of a matrix resin/fiber composite, comprising a thermosetting resin and densified PES in amounts up to about 40% by weight.

* * * * *